(12) United States Patent
Naiel et al.

(10) Patent No.: US 12,394,395 B2
(45) Date of Patent: Aug. 19, 2025

(54) VEHICLE SYSTEMS AND METHODS FOR ENVIRONMENTAL CAMERA VIEW DISPLAY ADAPTATION

(71) Applicant: GM GLOBAL TECHNOLOGY OPERATIONS LLC, Detroit, MI (US)

(72) Inventors: Mohamed A. Naiel, Ajax (CA); Daniel Xie, Oshawa (CA); Yun Qian Miao, Waterloo (CA); Sai Vishnu Aluru, Commerce Township, MI (US); Joseph G Machak, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 236 days.

(21) Appl. No.: 18/351,921

(22) Filed: Jul. 13, 2023

(65) Prior Publication Data
US 2025/0022437 A1    Jan. 16, 2025

(51) Int. Cl.
*B60R 1/22* (2022.01)
*G09G 5/10* (2006.01)
(Continued)

(52) U.S. Cl.
CPC ............... *G09G 5/10* (2013.01); *H04N 23/71* (2023.01); *H04N 23/73* (2023.01); *B60R 1/22* (2022.01);
(Continued)

(58) Field of Classification Search
CPC ............. G09G 5/10; G09G 2320/0626; G09G 2380/10; H04N 23/73; H04N 23/71; H04N 5/58; B60R 1/22
See application file for complete search history.

(56) References Cited

U.S. PATENT DOCUMENTS 10,573,270 B2 *   2/2020   Jo ........................... G06V 10/94
2014/0354811 A1   12/2014   Weber
(Continued)

FOREIGN PATENT DOCUMENTS

EP       3410702 A1      5/2018

OTHER PUBLICATIONS

Research Disclosure Database No. 681027, "Control Algorithm to Trigger Camera Frame Rate Alteration for Low Light Performance Enhancement," Dec. 2, 2020.

*Primary Examiner* — Antonio A Caschera
(74) *Attorney, Agent, or Firm* — Ingrassia Fisher & Lorenz, LLP | IF&L

(57) ABSTRACT

Vehicles and related systems and adaptive display adjustment methods include obtaining image data captured using an initial frame rate from an imaging system onboard the vehicle, obtaining current vehicle state information, determining a representative exposure setting for the imaging system based at least in part on the current vehicle state information, determining an estimated illuminance of a surrounding environment of the vehicle based at least in part on the image data and the representative exposure setting and automatically configuring the imaging system for a different, updated frame rate based on the estimated illuminance. Thereafter, the method continues by obtaining subsequent image data captured using the updated frame rate, providing a graphical user interface including a graphical representation of the subsequent image data on a display device associated with the vehicle, and dynamically adjusting a display characteristic after configuring the imaging system for the updated frame rate.

20 Claims, 3 Drawing Sheets

(51) Int. Cl.
*H04N 23/71* (2023.01)
*H04N 23/73* (2023.01)

(52) U.S. Cl.
CPC . *G09G 2320/0626* (2013.01); *G09G 2380/10* (2013.01)

(56) References Cited

U.S. PATENT DOCUMENTS

2016/0373684 A1* 12/2016 Sherman .............. H04N 23/745
2020/0096769 A1   3/2020 Lin et al.
2020/0202535 A1*  6/2020 Lee ........................ H04N 5/145

* cited by examiner

VEHICLE SYSTEMS AND METHODS FOR ENVIRONMENTAL CAMERA VIEW DISPLAY ADAPTATION

INTRODUCTION

The technical field generally relates to vehicle systems and more particularly relates to automatic camera view display adjustments for improved visibility based on the current environment.

Modern vehicles include various enhanced or advanced features to support a human driver operating a vehicle. Many vehicles are capable of sensing their environment and facilitating vehicle operation. For example, many vehicles are equipped with numerous different cameras to provide video or images of different regions external to the vehicle, such as, for example, backup cameras or rear view cameras, side view cameras, surround view cameras, and/or the like. The video or imagery captured by the onboard cameras is typically displayed on a dashboard display, such as, for example, an infotainment display or other center console display. The displayed video or imagery assists a driver with operating the vehicle, for example, by facilitating parking or other manual operation of the vehicle where visibility of external regions is desired.

In practice, camera systems and corresponding infotainment displays suffer from variations in illumination due to the azimuth angle of the sun (e.g., at dusk and/or dawn) or shadows by other external objects that influence the illumination of the scene external to the vehicle and/or the interior of the vehicle, such as, for example, infrastructure features (e.g., overpasses, garages, etc.), buildings, trees, geographic features and/or the like. The results in perceived variations in the display brightness, which, in turn, reduces the driver's visibility of the external region(s) and thereby reduces the efficacy of the display. Accordingly, it is desirable to provide adaptive camera and display systems for improved visibility and safety independent of illumination or environmental variations.

SUMMARY

Apparatus for a vehicle and related methods and vehicle systems are provided. One method of assisting operation of a vehicle involves a control module associated with the vehicle obtaining image data captured using an initial frame rate from an imaging system onboard the vehicle, obtaining current vehicle state information associated with the vehicle, determining a representative exposure setting for the imaging system based at least in part on the current vehicle state information, determining an estimated illuminance of a surrounding environment of the vehicle based at least in part on the image data and the representative exposure setting, and automatically configuring the imaging system for a second frame rate different from the initial frame rate based on the estimated illuminance. Thereafter, the method obtains subsequent image data from the imaging system captured using the second frame rate, provides a graphical user interface including a graphical representation of the subsequent image data on a display device associated with the vehicle, and adjusts a display characteristic of the graphical user interface over a temporary period of time after automatically configuring the imaging system for the second frame rate.

In some implementations, adjusting the display characteristic involves progressively adjusting a brightness of the graphical representation of the subsequent image data over the temporary period of time. In one or more implementations, progressively adjusting the brightness involves configuring the brightness of the graphical representation of an initial frame of the subsequent image data based on a weighted average of the initial frame of the subsequent image data captured using the second frame rate and a preceding frame of the image data captured using the initial frame rate. In some implementations, the method identifies one or more regions of interest within the image data, wherein determining the estimated illuminance involves converting RGB component values for the one or more regions of interest to YUV component values and averaging Y-channel luminance component values of the YUV component values across the one or more regions of interest. In one or more implementations, determining the representative exposure setting involves calculating the representative exposure setting as a weighted sum of respective exposure settings associated with respective imaging devices of the imaging system, wherein a respective weighting factor associated with a respective imaging device is influenced by a current state of a transmission system associated with the vehicle.

In one or more implementations, the current vehicle state information includes a current state of a transmission system of the vehicle, wherein determining the representative exposure setting involves calculating the representative exposure setting as a weighted sum of respective exposure settings associated with respective imaging devices of the imaging system, wherein a respective weighting factor associated with a respective imaging device is influenced by the current state of the transmission system associated with the vehicle. In one or more implementations, adjusting the display characteristic involves progressively increasing a brightness of the graphical representation of the subsequent image data over the temporary period of time after automatically configuring the imaging system for a lower frame rate. In other implementations, adjusting the display characteristic involves progressively decreasing a brightness of the graphical representation of the subsequent image data over the temporary period of time after automatically configuring the imaging system for a higher frame rate. In yet other implementations, automatically configuring the imaging system for the second frame rate involves automatically switching the imaging system from a higher frame rate to a lower frame rate when a current state of a transmission system of the vehicle corresponds to reverse and a redness score associated with the image data is greater than a threshold when the estimated illuminance of the surrounding environment of the vehicle is below a second threshold. In other implementations, adjusting the display characteristic of the graphical user interface involves dynamically adjusting a brightness of the display device based at least in part on the estimated illuminance.

An apparatus for a non-transitory computer-readable medium is also provided. The non-transitory computer-readable medium has executable instructions stored thereon that, when executed by a processor, cause the processor to provide an adaptive display service configurable to obtain image data captured using an initial frame rate from an imaging system onboard a vehicle, obtain current vehicle state information associated with the vehicle, determine a representative exposure setting for the imaging system based at least in part on the current vehicle state information, determine an estimated illuminance of a surrounding environment of the vehicle based at least in part on the image data and the representative exposure setting, and automatically configure the imaging system for a second frame rate different from the initial frame rate based on the estimated illuminance. Thereafter, the instructions cause the processor to obtain subsequent image data from the imaging system captured using the second frame rate, provide a graphical user interface including a graphical representation of the subsequent image data on a display device associated with the vehicle, and adjust a display characteristic of the graphical user interface over a temporary period of time after automatically configuring the imaging system for the second frame rate.

In one implementation, the adaptive display service is configurable to progressively adjust a brightness of the graphical representation of the subsequent image data over the temporary period of time. In another implementation, the adaptive display service is configurable to identify one or more regions of interest within the image data, wherein determining the estimated illuminance involves converting RGB component values for the one or more regions of interest to YUV component values and averaging Y-channel luminance component values of the YUV component values across the one or more regions of interest. In another implementation, the adaptive display service is configurable to obtain a current state of a transmission system of the vehicle, wherein determining the representative exposure setting involves calculating the representative exposure setting as a weighted sum of respective exposure settings associated with respective imaging devices of the imaging system, wherein a respective weighting factor associated with a respective imaging device is influenced by the current state of the transmission system associated with the vehicle. In another implementation, the adaptive display service is configurable to progressively increase a brightness of the graphical representation of the subsequent image data over the temporary period of time after automatically configuring the imaging system for a lower frame rate. In another implementation, the adaptive display service is configurable to progressively decrease a brightness of the graphical representation of the subsequent image data over the temporary period of time after automatically configuring the imaging system for a higher frame rate. In some implementations, the adaptive display service is configurable to automatically switch the imaging system from a higher frame rate to a lower frame rate when a current state of a transmission system of the vehicle corresponds to reverse and a redness score associated with the image data is greater than a threshold when the estimated illuminance of the surrounding environment of the vehicle is below a second threshold. In some implementations, the adaptive display service is configurable to dynamically adjust a brightness of the display device based at least in part on the estimated illuminance.

A vehicle system is also provided that includes an illuminance sensing element to provide a measured luminance, a steering system, a display device, an imaging system including a plurality of imaging devices, and a control module coupled to the illuminance sensing element, the steering system, the display device and the imaging system. The control module is configurable to configure the imaging system for an initial frame rate based on the measured luminance, determine a representative exposure setting for the imaging system based at least in part on a current steering angle associated with the steering system, determine an estimated illuminance of a surrounding environment based at least in part on the representative exposure setting and image data from the imaging system captured using the initial frame rate, automatically configure the imaging system for a second frame rate different from the initial frame rate based on the estimated illuminance, obtain subsequent image data from the imaging system captured using the second frame rate, provide a graphical user interface including a graphical representation of the subsequent image data on the display device, and adjust a display characteristic of the graphical user interface over a temporary period of time after automatically configuring the imaging system for the second frame rate. In one or more implementations, the vehicle system includes a transmission system, wherein the control module is configurable to determine the representative exposure setting in a manner that is influenced by a current state of the transmission system.

BRIEF DESCRIPTION OF THE DRAWINGS

The exemplary aspects will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary, or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
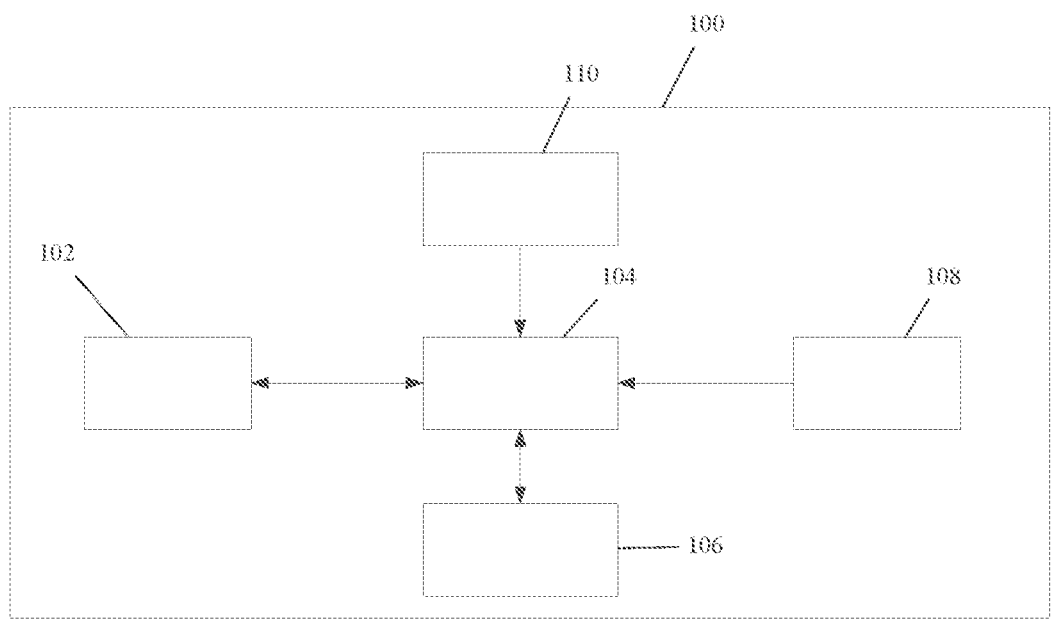
FIG. 1 is a block diagram illustrating a vehicle in accordance with various implementations.

FIG. 1 depicts an exemplary implementation of a vehicle 100 that includes an imaging system 102 that provides image data to display software at a control module 104 that renders, generates or otherwise provides a graphical user interface (GUI) on a display device 106 that includes one or more graphical representations of the image data captured by the imaging system 102. For example, in one or more implementations, the imaging system 102 is realized as a surround view camera system that includes a front view camera configured to capture a forward region in front of the vehicle 100 (e.g., a forward-looking camera mounted in a grille of the vehicle), a rear view camera configured to capture a region behind the vehicle 100, and side view cameras configured to capture regions laterally adjacent to the vehicle 100 (e.g., two side cameras mounted on the side mirrors). In such implementations, the display software may be capable of providing surround vision GUIs including, but not limited to, an overhead image, a bird's-eye view and/or a bowl view of the vehicle 100 in the context of the surrounding environment, a rear camera view when the vehicle 100 is shifted into reverse, a front camera view when the vehicle 100 is shifted into drive, a front or rear top-down view (e.g., as part of a park assistance system at low speeds), a front or rear perspective view of the vehicle 100, a front or rear side view external to the vehicle 100, and/or the like. In some implementations, the image data may be utilized for surround-video recordings, which may be stored at the vehicle 100 or uploaded to a remote location (e.g., cloud storage).

In exemplary implementations, the vehicle 100 is realized as an automotive vehicle, such as a passenger car, a sport utility vehicles (SUV), a pickup truck, or the like, but it should be appreciated that the subject matter described herein is not limited to automotive vehicles, and can be implemented in an equivalent manner in the context of any other vehicle including motorcycles, trucks, recreational vehicles (RVs), marine vessels, aircraft, and the like. It should be appreciated that FIG. 1 depicts a simplified representation of a vehicle 100 for purposes of explanation and is not intended to be limiting in any respect.

The imaging system 102 generally represents the combination of one or more cameras, image sensors, or other imaging devices configured to capture, sense or otherwise obtain image data representative of an environment in a vicinity of the vehicle 100 within a field of view associated with the respective camera or imaging device of the imaging system 102. For example, in exemplary implementations, the imaging system 102 includes a forward-looking camera mounted at the front of the vehicle 100 to capture image data for a forward region of the surrounding environment ahead of the vehicle 100, a rear view camera mounted at the rear of the vehicle 100 to capture image data for a region of the surrounding environment behind the vehicle 100, and side view cameras mounted on the side mirrors or other locations on the side of the vehicle 100 to capture image data for the surrounding environment in laterally adjacent regions. In one or more implementations, the imaging system 102 also includes one or more controllers or processors associated with the imaging devices to support communications with the control module 104 and facilitates management or control of one or more characteristics, parameters or other settings of the imaging devices by the control module 104. For example, as described in greater detail below, the control module 104 may interact with a controller of the imaging system 102 to control or otherwise adjust the exposure time or other exposure settings, frame rates, camera gain factors and/or the like.

The control module 104 generally represents the combination of hardware, software, firmware, processing logic and/or other components associated with the vehicle 100 that is configured to synthesize and process the image data from the imaging system 102 to generate GUIs on the display device 106 that include graphical representations of the region of the environment proximate the vehicle 100, as described in greater detail below. In exemplary implementations, the control module 104 is also configurable to support an adaptive camera mode and display mode where an adaptive display service at the control module 104 automatically adjusts one or more settings associated with the imaging devices of the imaging system 102, the display device 106 and/or the GUIs to adapt the frame rate, brightness, or other characteristics of the image data (or the graphical representations thereof) to improve visibility of the GUIs on the display device 106 in a manner that compensates for the current illumination of the surrounding environment indicated by an illuminance sensing element 108 (e.g., an ambient light sensor or luxmeter) and the current state of the vehicle 100 indicated by one or more onboard vehicle systems 110.

In exemplary implementations, the control module 104 includes at least one processor and a non-transitory computer readable storage device or media. The processor can be any custom made or commercially available processor, a central processing unit (CPU), a graphics processing unit (GPU), an auxiliary processor among several processors associated with the control module 104, a semiconductor-based microprocessor (in the form of a microchip or chip set), a microprocessor, any combination thereof, or generally any device for executing instructions. The computer readable storage device or media may include volatile and nonvolatile storage in read-only memory (ROM), random-access memory (RAM), and keep-alive memory (KAM), for example. KAM is a persistent or nonvolatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the control module 104. The instructions may include one or more separate programs, each of which comprises an ordered listing of executable instructions for implementing logical functions. The instructions, when executed by the processor, cause the control module 104 to receive and process signals and/or data from the imaging system 102, the illuminance sensing element 108 and/or the onboard systems 110 and provide an adaptive display service configurable to perform logic, calculations, methods and/or algorithms for adjusting one or more characteristics, parameters or other settings associated with at least one of the imaging system 102 and/or the display device 106.

In exemplary implementations, the display device 106 is realized as an electronic display device that is located onboard the vehicle 100 or otherwise associated with another system onboard the vehicle 100, such as, for example, any sort of infotainment module, navigation head unit, or another similar or suitable unit that resides onboard the vehicle 100, and which may be integrated into a dashboard or other console within a passenger compartment of the vehicle 100. In such implementations, the display device 106 may be coupled to the control module 104 via a bus interface or similar communications interface that includes the hardware, software, firmware, processing logic and/or other components for communicating to/from the display device 106, such as, for example, a processor, microcontroller or other electronics that supports communications over a controller area network (CAN) bus or other wired vehicle network.

In other implementations, the display device 106 may be realized as an electronic device associated with a vehicle owner or other user associated with the vehicle 100 that is separate and distinct from the vehicle 100 but communicatively coupled to the control module 104, such as, for example, a smartphone, a desktop computer, a mobile computer (e.g., a tablet computer, a laptop computer, or a netbook computer), a video game device, a digital media player, a piece of home entertainment equipment, a digital camera or video camera, a wearable computing device (e.g., smart watch, smart glasses, smart clothing), or the like. In such implementations, the control module 104 may be coupled to the display device 106 via a telematics system or other communication system configured to wirelessly communicate information to and from the control module 104 over a communication network, such as but not limited to, a network of other vehicles ("V2V" communication), an infrastructure network ("V2I" communication), a wireless local area network (WLAN), a personal area network (PAN), a cellular network, a dedicated short-range communications (DSRC) channel, and/or the like. In this regard, although FIG. 1 depicts the display device 106 as being associated with or otherwise located onboard the vehicle 100, in practice, the display device 106 may be separate and distinct from the vehicle 100.

The onboard systems 110 generally represents the combination of hardware, software, firmware, processing logic and/or other components associated with the vehicle 100 that are capable of providing current vehicle state information to the control module 104 for adaptively adjusting the imaging system 102 and/or the display device 106, as described in greater detail below. For example, the onboard systems 110 may include a navigation system or other positioning system that is configured to identify or otherwise determine the current heading of the vehicle 100, the current geographic location of the vehicle 100 and/or the like. Additionally, the onboard systems 110 may include a steering system capable of providing data and/or information identifying a current steering wheel angle associated with the steering system of the vehicle 100 and a transmission system capable of providing data and/or information identifying a current gear or transmission state for the vehicle 100 (e.g., drive, park, reverse, etc.).

Figure 2:
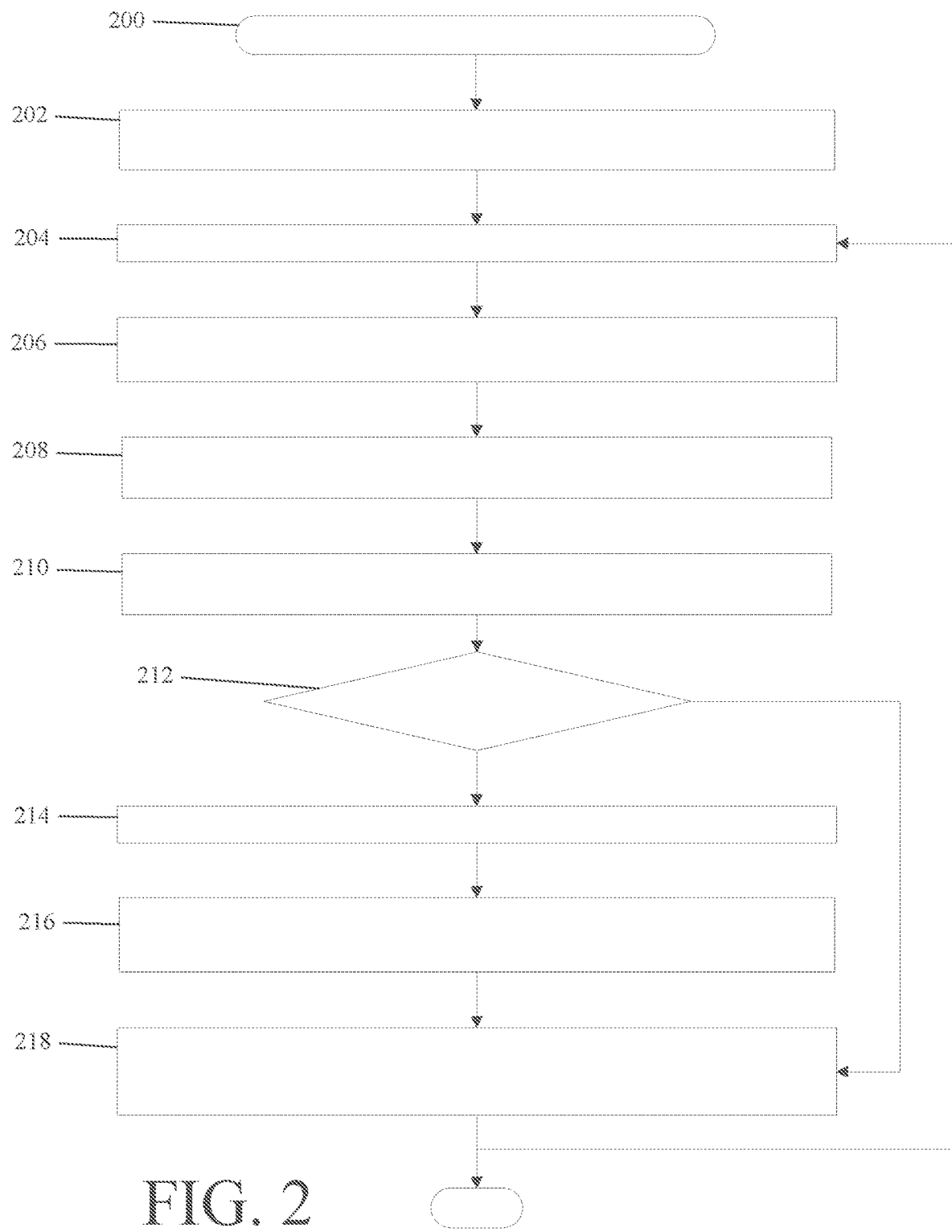
FIG. 2 is a flow diagram illustrating an adaptive camera display process suitable for use with the vehicle system of FIG. 1 in accordance with various implementations.

FIG. 2 depicts an exemplary implementation of an adaptive camera display process 200 suitable for implementation by a control module associated with a vehicle to automatically adjust characteristics, parameters or other settings associated with imaging devices and/or display devices substantially in real-time to dynamically and adaptively respond to environmental illuminance changes and/or vehicle state changes. For illustrative purposes, the following description may refer to elements mentioned above in connection with FIG. 1. While portions of the adaptive camera display process 200 may be performed by different elements of a vehicle system, for purposes of explanation, the subject matter may be primarily described herein in the context of the adaptive camera display process 200 being primarily performed by the control module 104.

Referring to FIG. 2 with continued reference to FIG. 1, the adaptive camera display process 200 initializes by obtaining the current luminance of the surrounding environment from the illuminance sensing element 108 and setting the initial frame rate setting for the imaging system 102 based on the environmental luminance at 202. In this regard, the control module 104 receives or otherwise obtains the current luminance measurement value output by the luxmeter or other illuminance sensing element 108 onboard the vehicle 100 and then sets the initial frame rate for the imaging system 102 based on the current luminance. For example, the illuminance sensing element 108 may be realized as a luxmeter positioned on or around the dashboard or front windshield of the vehicle 100 to measure the ambient illuminance at a location that is ahead of the driver of the vehicle 100. When the current ambient illuminance is greater than or equal to a threshold value, the control module 104 commands, signals or otherwise instructs the imaging system 102 to configure the cameras or other imaging devices for a high frame rate operating mode (e.g., 30 frames per second). On the other hand, when the current ambient illuminance is less than the threshold value, the control module 104 commands, signals or otherwise instructs the imaging system 102 to configure the cameras or other imaging devices for a low frame rate operating mode (e.g., 15 frames per second) to facilitate increased exposure times.

After initializing the frame rate operating mode for the imaging system 102, the adaptive camera display process 200 analyzes the image data captured by the imaging system 102 to determine an estimated ambient illuminance for the surrounding environment based on the image data and the current vehicle dynamics and dynamically adjusts the frame rate operating mode of the imaging system 102 in response to variations in the estimated ambient illuminance. In exemplary implementations, the adaptive camera display process 200 receives or otherwise obtains current vehicle state information at 204 and then calculates or otherwise determines a representative exposure setting for the fused surround view image or other fusion of the image data from the individual cameras or imaging devices based on the current vehicle state at 206. In this regard, the adaptive camera display process 200 utilizes the current state of the vehicle transmission and the current steering wheel angle associated with the vehicle steering system to determine which camera(s) are most relevant to the current operation of the vehicle 100 and then computes the representative exposure setting as a weighted average of the exposure settings of the individual cameras, where the weighting factors are dynamically determined based on the steering wheel angle and transmission state to preferentially weight the camera(s) most relevant to the current vehicle operation. In this regard, the representative exposure setting ($e_D$) may be represented by the equation $e_D = \Sigma_i w_i e_i$, where $e_i$ represents the exposure setting of a respective camera (i) and $w_i$ represents the weighting factor assigned to the respective camera, where $\Sigma_i w_i = 1$.

For example, in an implementation where the imaging system 102 includes four cameras (e.g., forward, rear and two side view cameras), when the transmission of the vehicle 100 is in drive indicating forward operation of the vehicle 100 is most relevant, the weighting factors associated with the respective cameras may be governed by the following set of equations:

$$\hat{w}_{front} = \max(0.4, \cos(SWA));$$

$$\hat{w}_{right} = \begin{cases} \min(0.2, \cos(90 - SWA)), & \text{if } SWA > 0 \\ 0.1, & \text{if } SWA \leq 0 \end{cases};$$

$$\hat{w}_{left} = \begin{cases} \min(0.2, \cos(-SWA)), & \text{if } SWA \leq 0 \\ 0.1, & \text{if } SWA > 0 \end{cases}; \text{ and}$$

$$\hat{w}_{rear} = 0.1,$$

where SWA represents the current steering wheel angle and the weighting factor values are normalized such that the sum of the respective weighting factors is equal to 1 in accordance with the equation $$w_i = \frac{\hat{w}_i}{\sum_i \hat{w}_i}.$$

In this regard, the adaptive camera display process 200 preferentially weights the exposure setting of the forward camera when the transmission is in drive and increasingly weights one of the left and right side cameras in accordance with the steering wheel angle in accordance with the magnitude of the steering wheel angle, while deemphasizing the exposure setting of the rear camera and other side camera opposite the steering wheel angle based on the magnitude of the angle. In a similar manner, when the transmission of the vehicle 100 is in reverse indicating rearward operation of the vehicle 100 is most relevant, the weighting factors associated with the respective cameras may be governed by the following set of equations:

$$\hat{w}_{rear} = \max(0.4, \cos(SWA));$$

$$\hat{w}_{left} = \begin{cases} \min(0.2, \cos(90 - SWA)), \text{ if } SWA > 0 \\ 0.1, \text{ if } SWA \leq 0 \end{cases};$$

$$\hat{w}_{right} = \begin{cases} \min(0.2, \cos(-SWA)), \text{ if } SWA \leq 0 \\ 0.1, \text{ if } SWA > 0 \end{cases}; \text{ and}$$

$$\hat{w}_{front} = 0.1.$$

After determining the representative exposure setting, the adaptive camera display process 200 identifies or otherwise determines one or more regions of interest within the image data captured by the imaging system 102 at 208 and then calculates or otherwise determines an estimated illuminance of the surrounding environment based on the image data corresponding to identified regions of interest using the representative exposure setting at 210. In exemplary implementations, the control module 104 filters the image data from the different cameras of the imaging system 102 to exclude or otherwise remove subsets or regions of the image data corresponding to the sky, shadows, or other visual artifacts or distortion (e.g., dark regions about the periphery of the camera field of view due to the focal length of the camera lens, such as a fish eye lens) that are not representative of the illuminance of the environment surrounding the vehicle 100. After filtering out subsets of image data corresponding to the non-environmental regions, in exemplary implementations, the remaining subsets of image data corresponding to the environmental regions of interest are converted from RGB color model component values into corresponding YUV color model component values before calculating or otherwise determining an average of the Y-channel luminance component values across the identified environmental regions of interest. In this regard, the average of the Y-channel luminance component provides a robust average brightness metric of the vehicle's environment for applications such as the camera system's auto-exposure/auto-gain algorithm, adaptive display right brightness algorithm, headlight/taillight brightness adjustment algorithm, etc.

In exemplary implementations, the adaptive camera display process 200 utilizes the estimated illuminance of the surrounding environment based on the image data to dynamically determine whether to adjust the frame rate setting for the imaging system 102 based on changes to the surrounding environment and different vehicle dynamics at 212 and commands, signals, instructs or otherwise configures the imaging system 102 for the different frame rate at 214 when the estimated illuminance indicates the frame rate should be changed. In this regard, when the current frame rate setting of the imaging system 102 corresponds to the low frame rate operating mode, the control module 104 may automatically determine to adjust the frame rate setting of the imaging system 102 to the high frame rate operating mode when the estimated illuminance of the imagery of the surrounding environment is greater than a threshold and provide corresponding commands or instructions to the imaging system 102 to configure the cameras of the imaging system 102 for the high frame rate operating mode. Similarly, when the current frame rate setting of the imaging system 102 corresponds to the high frame rate operating mode, the control module 104 may automatically determine to adjust the frame rate setting of the imaging system 102 to the low frame rate operating mode when the estimated illuminance of the imagery of the surrounding environment is below a threshold and provide corresponding commands or instructions to the imaging system 102 to configure the cameras of the imaging system 102 for the low frame rate operating mode. In this regard, the thresholds for dynamically and adaptively switching frame rates may incorporate an offset to provide hysteresis to prevent successively toggling the imaging system 102 back and forth between different frame rates.

Still referring to FIG. 2, in exemplary implementations, when the adaptive camera display process 200 changes the frame rate at the imaging system 102, the adaptive camera display process 200 temporarily smooths the brightness of the subsequent image data captured using the different frame rate across successive frames over a transition period of time at 216. In this regard, the change in camera frame rate can result in an abrupt change to the image brightness that can impact the driver's or other user's ability to accurately perceive the surrounding environment depicted on the display device 106. Accordingly, in exemplary implementations, the control module 104 progressively increases or decreases the image brightness in response to changing the frame rate setting of the imaging system 102 over the duration of a transition period of time before ceasing any smoothing or adjustment of the image brightness. In one or more implementations, the control module 104 utilizes a multiplier that incrementally increases or decreases in a linear or semi-linear manner over the transition period to linearly smooth the perceived image brightness upon a frame rate transition.

For example, in one implementation, when transitioning from a high frame rate operating mode to a low frame rate operating mode, the smoothing multiplier ($\delta_t$) utilized to adjust or scale the image brightness may be governed by the equation $\delta_t = \delta_0 + (t-1)\delta_{step}$, where t represents the respective frame number for the respective frame of the low frame operating mode until reaching a maximum number of transition frames ($t_w$) for terminating the smoothing multiplier, $\delta_{step}$ represents the amount by which to incrementally adjust the value of the smoothing multiplier that is governed by the equation $$\delta_{step} = \frac{1 - \delta_0}{t_w},$$

and $\delta_0$ is a constant based on a relationship or ratio between the luminance of the preceding image data captured in the high frame rate operating mode and the luminance of the initial image data upon transitioning to the low frame rate operating mode. Conversely, when transitioning from the low frame rate operating mode to the high frame rate operating mode, the smoothing multiplier ($\delta_t$) utilized to adjust or scale the image brightness may be governed by the equation $\delta_t = \delta_0 - (t-1)\delta_{step}$, where t represents the respective frame number for the respective frame of the low frame operating mode until reaching a maximum number of transition frames ($t_w$) for terminating the smoothing multiplier, $\delta_{step}$ represents the amount by which to incrementally adjust the value of the smoothing multiplier that is governed by the equation $$\delta_{step} = \frac{1-\delta_0}{t_w},$$

and $\delta_0$ is equal to 1.

Referring again to FIG. 2, in exemplary implementations, the adaptive camera display process 200 also dynamically adapts and adjusts the display brightness substantially in real-time based on the estimated illuminance of the current surrounding environment using the current vehicle state information at 218. In this regard, the control module 104 calculates or otherwise determines a brightness setting value based on a weighted average of the estimated illuminance derived from the regions of interest in the image data (determined at 210) and the current luminance measurement value output by the luxmeter or other illuminance sensing element 108, where the weighting factors vary depending on the current transmission state of the vehicle 100. For example, in one implementation, the adaptive display brightness setting value for the current frame ($\hat{b}_t$) is determined as a weighted average of a raw brightness setting value calculated for the current frame ($b_t$) and the raw brightness setting value calculated for the preceding frame ($b_{t-1}$), which may governed by the equation $\hat{b}_t = \alpha b_t + (1-\alpha) b_{t-1}$, where $\alpha$ is a weighting factor with a value between zero and one. The raw brightness setting value may be calculated based on the fused illuminance estimation for the current frame ($\hat{\mu}$) in accordance with the equation $$b_t = b_{min} + (b_{max} - b_{min})\left(\frac{\hat{\mu}}{\mu_{c_{max}}}\right)^{\frac{1}{g}},$$

where $b_{min}$ represents the minimum raw brightness setting value calculated for a preceding frame, $b_{max}$ represents the maximum raw brightness setting value calculated for a preceding frame, $\mu_{c_{max}}$ represents the maximum estimated illuminance derived from a frame of image data, g is a calibratable parameter controlling the curvature of change of the adaptive display brightness setting value, and the fused illuminance estimation is calculated based on the estimated illuminance derived from the current frame of image data and the current luminance measurement value.

In one or more implementations, the fused illuminance estimation for the current frame ($\hat{\mu}$) is calculated as a weighted average of the estimated illuminance derived from the current frame of image data and the current luminance measurement value in a manner that varies depending on the current transmission state in accordance with the equation $\hat{\mu}=$ $$\begin{cases} 0.5\mu_c + 0.5\hat{l} & \text{if transmission = drive or } l > 400 \\ 0.65\mu_c + 0.35\hat{l} & \text{if transmission} \neq \text{drive or } l \leq 400 \end{cases},$$

where $\mu_c$ is the estimated illuminance derived from the current frame of image data and l is the current luminance measurement value and $\hat{l}$ is calculated based on a ratio of the current luminance measurement value to a threshold luminance value (e.g., 65000 lumens). In this regard, the fused illuminance estimation may increasingly weight the estimated illuminance derived from the current frame of image data in low light environments or when the vehicle 100 is in reverse, park, or otherwise not traveling in a forward direction corresponding to the forward location of the illuminance sensing element 108.

In one or more exemplary implementations, for purposes of adaptively adjusting the display brightness, the estimated illuminance derived from the current frame of image data is calculated as a weighted sum of the estimated illuminance derived from the respective image data from each of the cameras of the imaging system 102 in accordance with the equation $\mu_c = \Sigma_i w_i \mu_i$, where $\mu_i$ represents the estimated illuminance associated with the respective camera and $w_i$ represents the weighting factor associated with the respective camera. In exemplary implementations, the weighting factors satisfy the equation $\Sigma_i w_i = 1$ and $w_i$ varies depending on the relationship between the orientation or field of view of the camera and the current transmission state for the vehicle 100 in accordance with the equation $w_i = \gamma_i \beta_i$, where $\gamma_i$ represents a transmission-based weighting factor and $\beta_i$ represents a weighting factor corresponding to the viewing angle of the respective camera with respect to the road. For example, when the current transmission state corresponds to drive or another forward gear, the adaptive camera display process 200 may adjust transmission-based weighting factor to increasingly weight the forward camera and decrease the transmission-based weighting of the rear camera, while conversely, when the current transmission state corresponds to reverse, the adaptive camera display process 200 may adjust the transmission-based weighting factor to increasingly weight the rear camera and decrease the transmission-based weighting of the front camera. The adaptive camera display process 200 may also use the heading, navigational map data, and potentially other information available from other vehicle systems 110 to calculate, estimate or otherwise determine the road viewing angle for a particular camera to increasingly or decreasingly adjust the viewing angle weighting factor $\beta_i$ based on the heading of the vehicle 100 and the orientation of the respective camera in relation to the heading or orientation of the current lane of travel.

Still referring to FIGS. 1-2, after determining the adaptive display brightness setting value, the control module 104 automatically commands, signals or otherwise instructs the display device 106 to correspondingly increase or decrease the brightness of the display device 106 to adapt to the current illuminance of the vehicle 100 and the surrounding environment in a manner that accounts for the current transmission state and heading of the vehicle 100. By using a moving average to determine the adaptive display brightness setting value over successive frames, the display brightness transitions smoothly, thereby improving perception of the GUI displays and related imagery depicted on the display device 106.

The loop defined by 204, 206, 208, 210, 212, 214, 216 and 218 may repeat indefinitely during operation of the vehicle 100 to dynamically adjust one or more of the frame rate, the image luminance and the display brightness substantially in real-time in response to changes in the illuminance associated with the surrounding environment and/or changes to the vehicle state to improve driver perception of the imagery depicted on the display device 106. By smoothly or progressively adjusting the brightness associated with the image data and/or the brightness setting of the display device 106, human factors are improved by avoiding abrupt changes in brightness or perceived luminance that could impact the ability of a driver to ascertain or assess the surrounding environment depicted on the display device 106.

Figure 3:
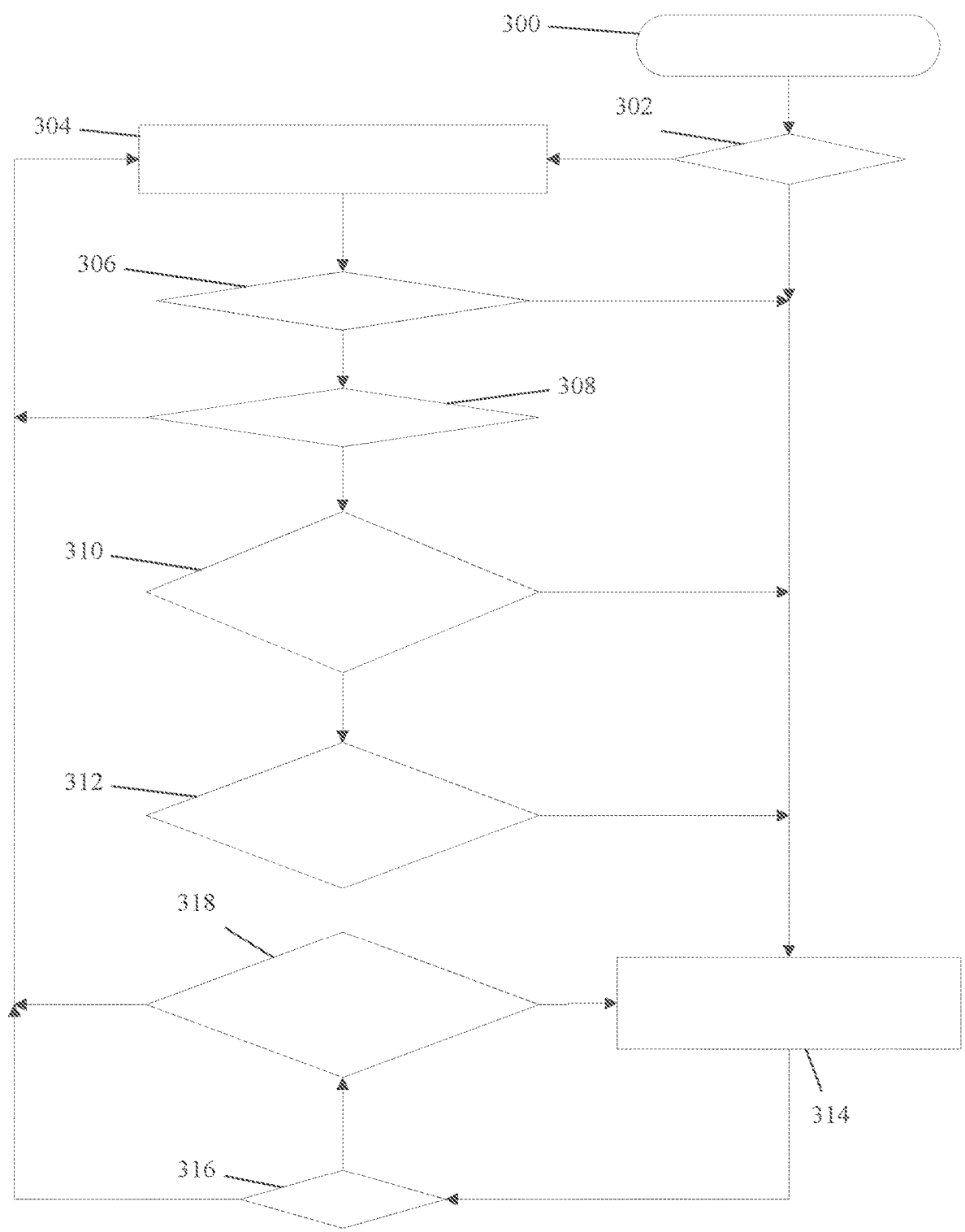
FIG. 3 is a flow diagram illustrating a frame rate selection process suitable for use with the vehicle system of FIG. 1 in connection with the adaptive camera display process of FIG. 2 according to one or more implementations described herein.

FIG. 3 depicts an exemplary implementation of a frame rate selection process 300 suitable for implementation in connection with the adaptive camera display process 200 (e.g., at 212 and 214) to automatically change the frame rate based on the estimated or perceived luminance of the surrounding environment substantially in real-time to dynamically and adaptively respond to environmental illuminance changes and/or vehicle state changes. For illustrative purposes, the following description may refer to elements mentioned above in connection with FIG. 1. While portions of the frame rate selection process 300 may be performed by different elements of a vehicle system, for purposes of explanation, the subject matter may be primarily described herein in the context of the frame rate selection process 300 being primarily performed by the control module 104.

The frame rate selection process 300 initializes by determining whether to configure the imaging system 102 for a higher frame rate operating mode or a lower frame rate operating mode based on the current luminance measured by the illuminance sensing element 108 at 302. In this regard, when the current value for the measured luminance is greater than or equal to an initial selection threshold, the frame rate selection process 300 automatically configures the imaging system 102 for the higher frame rate operating mode at 304. On the other hand, when the current value for the measured luminance is less than the initial selection threshold (e.g., $l<l_0$), the frame rate selection process 300 automatically configures the imaging system 102 for the lower frame rate operating mode at 314.

After configuring the imaging system 102 for the higher frame rate operating mode, the frame rate selection process 300 calculates or otherwise determines an estimated illuminance of the surrounding environment based on the image data (e.g., at 210) and then verifies the estimated illuminance based on the captured image data for the regions of interest is above a lower luminance threshold for switching frame rates at 306 and automatically switches from the higher frame rate operating mode to the lower frame rate operating mode when the estimated illuminance is below the lower luminance threshold (e.g., $l<l_1$). In this regard, the lower luminance threshold for switching from the higher frame rate operating mode to the lower frame rate operating mode may be less than the initial selection threshold (e.g., $l_1<l_0$) to prevent spurious transitions or toggling between frame rate operating modes. In this manner, the control module 104 automatically transitions the imaging system 102 from the higher frame rate operating mode to the lower frame rate operating mode when the estimated illuminance derived from the captured image data indicates a sufficient decrease in the perceived ambient illumination of the surrounding environment.

The frame rate selection process 300 also verifies the estimated illuminance is above an intermediate luminance threshold at 308, and when the estimated illuminance is less than the intermediate luminance threshold (e.g., $l<l_2$), the frame rate selection process 300 determines whether the perceived luminance is attributable to the vehicle brake lights at 310. In this regard, the intermediate luminance threshold may be greater than the lower threshold for automatic switching from the higher frame rate operating mode to the lower frame rate operating mode (e.g., $l_1<l_2$), where the frame rate selection process 300 analyzes the current transmission state for the vehicle 100 and the amount of redness in the captured image data to verify the difference between the estimated illuminance and the lower luminance threshold is not merely due to the vehicle brake lights. For example, in one implementation, the frame rate selection process 300 calculates or otherwise determines a redness score for the captured image data (e.g., a red component percentage relative to other RGB components), and then determines that the estimated illuminance is attributable to the vehicle brake lights when the current transmission gear state corresponds to reverse and the redness score is greater than a threshold percentage (e.g., 30%). In this regard, the control module 104 automatically transitions the imaging system 102 from the higher frame rate operating mode to the lower frame rate operating mode when the estimated illuminance derived from the captured image data is relatively low and attributable to the vehicle brake lights rather than the ambient illumination of the surrounding environment.

Additionally, in exemplary implementations, when the estimated illuminance is less than the intermediate luminance threshold and is not attributable to the vehicle brake lights, the frame rate selection process 300 also verifies or otherwise confirms that the brightness of each respective image frame captured by a respective camera or imaging device of the imaging system 102 is greater than a brightness threshold at 312. In this regard, if the brightness of one of the forward, rear or side view camera images is below the brightness threshold, the frame rate selection process 300 may automatically transition the imaging system 102 from the higher frame rate operating mode to the lower frame rate operating mode to increase the likelihood of each of the captured images from the respective cameras of the imaging system 102 having adequate brightness for presentation on the display device 106.

When the estimated illuminance of the captured image data is maintained above the lower and intermediate luminance thresholds, the frame rate selection process 300 maintains the higher frame rate operating mode (e.g., at 212) and allows the adaptive camera display process 200 to dynamically adjust the display brightness based on the estimated illuminance of the current surrounding environment as perceived with the higher frame rate operating mode at 218. On the other hand, when the estimated illuminance of the captured image data falls below the lower luminance threshold at 306, one of the captured images falls below a threshold brightness at 312, or the estimated illuminance of the captured image data is attributable to the vehicle brake lights, the frame rate selection process 300 automatically switches the imaging system 102 from the higher frame rate operating mode to the lower frame rate operating mode at 314 (e.g., at 214 of the adaptive camera display process 200) which initiates the transition period for the adaptive camera display process 200 smoothing the perceived image brightness of the image data subsequently captured in the lower frame rate operating mode at 216. Thus, when the frame rate selection process 300 automatically changes the frame rate operating mode from the higher frame rate operating mode to the lower frame rate operating mode, the adaptive camera display process 200 smooths the perceived image brightness in order to avoid an abrupt change in brightness that could otherwise occur due to the increased exposure time associated with the lower frame rate.

Still referring to FIG. 3, in a similar manner as described in the context of the higher frame rate operating mode, after configuring the imaging system 102 for the lower frame rate operating mode, the frame rate selection process 300 calculates or otherwise determines an estimated illuminance of the surrounding environment based on the image data (e.g., at 210) and then verifies the estimated illuminance based on the captured image data for the regions of interest does not exceed an upper luminance threshold for switching frame rates at 316. In this regard, the upper luminance threshold is greater than the intermediate luminance threshold by some offset (e.g., $\Delta l$) to provide hysteresis that prevents toggling between different frame rates. When the estimated illuminance is greater than an upper luminance threshold (e.g. $l > l_2 + \Delta l$), the frame rate selection process 300 automatically transitions the imaging system 102 from the lower frame rate operating mode to the higher frame rate operating mode.

Additionally, in exemplary implementations, the frame rate selection process 300 also verifies or otherwise confirms whether the brightness of each respective image frame captured by a respective camera or imaging device of the imaging system 102 is greater than a brightness threshold at 318. In this regard, when the brightness of each of the forward, rear or side view camera images is above the brightness threshold, the frame rate selection process 300 may automatically transition the imaging system 102 from the lower frame rate operating mode to the higher frame rate operating mode to improve visibility of the captured images.

As described above, when the frame rate selection process 300 automatically switches the imaging system 102 from the lower frame rate operating mode to the higher frame rate operating mode at 214, the transition period is initialized for the adaptive camera display process 200 smoothing the perceived image brightness of the image data subsequently captured in the higher frame rate operating mode at 216. Thus, when the frame rate selection process 300 automatically changes the lower frame rate operating mode to the higher frame rate operating mode, the adaptive camera display process 200 smooths the perceived image brightness in order to avoid an abrupt dimming that could otherwise occur due to the decreased exposure time associated with the higher frame rate.

By automatically and adaptively transitioning between different frame rate operating modes and smoothing the resulting image data accordingly, the vehicle 100 can move from light to dark environments, or vice versa, without degrading the driver's ability to perceive the GUIs displayed on the display device 106. Additionally, the luminance or brightness of the captured image data and corresponding GUIs depicted on the display device 106 may be adapted to the perceived environment in a manner that reflects the current operation of the vehicle 100 (e.g., the current transmission gear state, the current steering wheel angle, the current vehicle heading and/or the like) as well as the ambient illuminance of the region of interest within the surrounding environment. For example, surround-view camera systems and fused images are capable of playing an important role in parking assistance and other viewing and perception applications, but are susceptible to illumination variations due to physical phenomena (e.g., dusk or dawn) or when a vehicle is entering or existing a different environment (e.g., a garage). By virtue of the subject matter described herein, surround view camera systems can quickly adapt to these types of variations while avoiding abrupt changes in the display brightness that could otherwise reduce perception and traffic safety. Using the steering wheel angle, transmission state, and potentially other factors, the subject matter described herein is capable of reliably determining the brightness around a host vehicle by localized analysis limited to those regions that are most likely to be of interest given the current vehicle state, and then utilizing adaptive camera frame rate and camera exposure techniques adapt the captured images to the current environment while smoothing brightness transitions on the display. This improves the driver's visibility of the surrounding environment and improves traffic safety by quickly adapting the image and display brightness in response to illumination variations to improve perception and eye comfort, which, in turn, improves driver confidence and situational awareness and allows the driver to see across multiple views and image frames in more coherent way.

For sake of brevity, conventional techniques related to lane keep assistance, driver assistance features, autonomous vehicles, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an implementation of the subject matter.

As used herein, the word "exemplary" means "serving as an example, instance, or illustration." Thus, any implementation described herein as "exemplary" is not necessarily to be construed as preferred or advantageous over other implementations. All of the implementations described herein are exemplary implementations provided to enable persons skilled in the art to make or use the invention and not to limit the scope of the invention which is defined by the claims.

Those of skill in the art will appreciate that the various illustrative logical blocks, modules, circuits, and algorithm steps described in connection with the implementations disclosed herein may be implemented as electronic hardware, computer software, or combinations of both. Some of the implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is logically coherent.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an implementation of the depicted subject matter. In addition, certain terminology may also be used herein for the purpose of reference only, and thus are not intended to be limiting.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the disclosure in any way. Rather, the foregoing detailed description will provide those skilled in the art with a convenient road map for implementing the exemplary aspect or exemplary aspects. It should be understood that various changes can be made in the function and arrangement of elements without departing from the scope of the disclosure as set forth in the appended claims and the legal equivalents thereof.

What is claimed is:

1. A method comprising:
    obtaining, by a control module associated with a vehicle, image data from an imaging system onboard the vehicle, the image data being captured using an initial frame rate at the imaging system;
    obtaining, by the control module, current vehicle state information associated with the vehicle;
    determining, by the control module, a representative exposure setting for the imaging system based at least in part on the current vehicle state information;
    determining, by the control module, an estimated illuminance of a surrounding environment of the vehicle based at least in part on the image data and the representative exposure setting;
    automatically configuring, by the control module, the imaging system for a second frame rate different from the initial frame rate based on the estimated illuminance; and
    thereafter:
        obtaining subsequent image data from the imaging system captured using the second frame rate;
        providing a graphical user interface comprising a graphical representation of the subsequent image data on a display device associated with the vehicle; and
        adjusting a display characteristic of the graphical user interface over a period of time after automatically configuring the imaging system for the second frame rate.

2. The method of claim 1, wherein adjusting the display characteristic comprises progressively adjusting a brightness of the graphical representation of the subsequent image data over the period of time, and the period of time comprises a transition period of time during which the brightness is adjusted.

3. The method of claim 2, wherein progressively adjusting the brightness comprises configuring the brightness of the graphical representation of an initial frame of the subsequent image data based on a weighted average of the initial frame of the subsequent image data captured using the second frame rate and a preceding frame of the image data captured using the initial frame rate.

4. The method of claim 1, further comprising identifying, by the control module, one or more regions of interest within the image data, wherein determining the estimated illuminance comprises:
    converting RGB component values for the one or more regions of interest to YUV component values; and
    averaging Y-channel luminance component values of the YUV component values across the one or more regions of interest.

5. The method of claim 4, wherein determining the representative exposure setting comprises calculating the representative exposure setting as a weighted sum of respective exposure settings associated with respective imaging devices of the imaging system, wherein a respective weighting factor associated with a respective imaging device is influenced by a current state of a transmission system associated with the vehicle.

6. The method of claim 1, the current vehicle state information comprising a current state of a transmission system of the vehicle, wherein determining the representative exposure setting comprises calculating the representative exposure setting as a weighted sum of respective exposure settings associated with respective imaging devices of the imaging system, wherein a respective weighting factor associated with a respective imaging device is influenced by the current state of the transmission system associated with the vehicle.

7. The method of claim 1, wherein adjusting the display characteristic comprises progressively increasing a brightness of the graphical representation of the subsequent image data over the period of time after automatically configuring the imaging system for a lower frame rate.

8. The method of claim 1, wherein adjusting the display characteristic comprises progressively decreasing a brightness of the graphical representation of the subsequent image data over the period of time after automatically configuring the imaging system for a higher frame rate.

9. The method of claim 1, wherein automatically configuring the imaging system for the second frame rate comprises automatically switching the imaging system from a higher frame rate to a lower frame rate when a current state of a transmission system of the vehicle corresponds to reverse and a redness score associated with the image data is greater than a threshold when the estimated illuminance of the surrounding environment of the vehicle is below a second threshold.

10. The method of claim 1, wherein adjusting the display characteristic of the graphical user interface comprises dynamically adjusting a brightness of the display device based at least in part on the estimated illuminance.

11. A non-transitory computer-readable medium comprising executable instructions that, when executed by a processor, cause the processor to provide an adaptive display service configurable to:
- obtain image data from an imaging system onboard a vehicle, the image data being captured using an initial frame rate at the imaging system;
- obtain current vehicle state information associated with the vehicle;
- determine a representative exposure setting for the imaging system based at least in part on the current vehicle state information;
- determine an estimated illuminance of a surrounding environment of the vehicle based at least in part on the image data and the representative exposure setting;
- automatically configure the imaging system for a second frame rate different from the initial frame rate based on the estimated illuminance; and
- thereafter:
  - obtain subsequent image data from the imaging system captured using the second frame rate;
  - provide a graphical user interface comprising a graphical representation of the subsequent image data on a display device associated with the vehicle; and
  - adjust a display characteristic of the graphical user interface over a period of time after automatically configuring the imaging system for the second frame rate.

12. The non-transitory computer-readable medium of claim 11, wherein the adaptive display service is configurable to progressively adjust a brightness of the graphical representation of the subsequent image data over the period of time, and the period of time comprises a transition period of time during which the brightness is adjusted.

13. The non-transitory computer-readable medium of claim 11, wherein the adaptive display service is configurable to identify one or more regions of interest within the image data, wherein determining the estimated illuminance comprises:
- converting RGB component values for the one or more regions of interest to YUV component values; and
- averaging Y-channel luminance component values of the YUV component values across the one or more regions of interest.

14. The non-transitory computer-readable medium of claim 11, wherein the adaptive display service is configurable to obtain a current state of a transmission system of the vehicle, wherein determining the representative exposure setting comprises calculating the representative exposure setting as a weighted sum of respective exposure settings associated with respective imaging devices of the imaging system, wherein a respective weighting factor associated with a respective imaging device is influenced by the current state of the transmission system associated with the vehicle.

15. The non-transitory computer-readable medium of claim 11, wherein the adaptive display service is configurable to progressively increase a brightness of the graphical representation of the subsequent image data over the period of time after automatically configuring the imaging system for a lower frame rate.

16. The non-transitory computer-readable medium of claim 11, wherein the adaptive display service is configurable to progressively decrease a brightness of the graphical representation of the subsequent image data over the period of time after automatically configuring the imaging system for a higher frame rate.

17. The non-transitory computer-readable medium of claim 11, wherein the adaptive display service is configurable to automatically switch the imaging system from a higher frame rate to a lower frame rate when a current state of a transmission system of the vehicle corresponds to reverse and a redness score associated with the image data is greater than a threshold when the estimated illuminance of the surrounding environment of the vehicle is below a second threshold.

18. The non-transitory computer-readable medium of claim 11, wherein the adaptive display service is configurable to dynamically adjust a brightness of the display device based at least in part on the estimated illuminance.

19. A vehicle system comprising:
- an illuminance sensing element to provide a measured luminance;
- a steering system;
- a display device;
- an imaging system comprising a plurality of imaging devices; and
- a control module coupled to the illuminance sensing element, the steering system, the display device and the imaging system, wherein the control module is configurable to:
  - configure the imaging system for an initial frame rate based on the measured luminance;
  - determine a representative exposure setting for the imaging system based at least in part on a current steering angle associated with the steering system;
  - determine an estimated illuminance of a surrounding environment based at least in part on the representative exposure setting and image data from the imaging system captured using the initial frame rate;
  - automatically configure the imaging system for a second frame rate different from the initial frame rate based on the estimated illuminance;
  - obtain subsequent image data from the imaging system captured using the second frame rate;
  - provide a graphical user interface comprising a graphical representation of the subsequent image data on the display device; and
  - adjust a display characteristic of the graphical user interface over a period of time after automatically configuring the imaging system for the second frame rate.

20. The vehicle system of claim 19, wherein the control module is configurable to progressively adjust a brightness of the graphical representation of the subsequent image data over the period of time, and the period of time comprises a transition period of time during which the brightness is adjusted.

* * * * *